(12) United States Patent
Fong

(10) Patent No.: US 7,011,783 B2
(45) Date of Patent: Mar. 14, 2006

(54) COOLING TECHNIQUES IN SOLID FREEFORM FABRICATION

(75) Inventor: Jon Jody Fong, Calabasas, CA (US)

(73) Assignee: 3D Systems, Inc., Valenda, CA (US)

( * ) Notice: Subject to any disclaimer, the term of this patent is extended or adjusted under 35 U.S.C. 154(b) by 0 days.

(21) Appl. No.: 10/001,727

(22) Filed: Dec. 5, 2001

(65) Prior Publication Data

US 2003/0075836 A1 Apr. 24, 2003

Related U.S. Application Data

(63) Continuation-in-part of application No. 10/000,854, filed on Oct. 24, 2001.

(51) Int. Cl.
  *B28B 1/30* (2006.01)

(52) U.S. Cl. .................. 264/308; 264/348; 264/237
(58) Field of Classification Search .............. 264/308, 264/348, 237; 118/63, 69
See application file for complete search history.

(56) References Cited

U.S. PATENT DOCUMENTS

| | | | |
|---|---|---|---|
| 4,340,563 A | * | 7/1982 | Appel et al. ............... 264/518 |
| 4,593,292 A | | 6/1986 | Lewis |
| 4,609,924 A | | 9/1986 | De Young |
| 4,631,557 A | | 12/1986 | Cooke et al. |
| 4,636,803 A | | 1/1987 | Mikalsen |
| 4,682,185 A | | 7/1987 | Martner |
| 5,135,379 A | | 8/1992 | Fudim |
| 5,136,515 A | | 8/1992 | Helinski |
| 5,280,300 A | | 1/1994 | Fong et al. |
| 5,287,435 A | | 2/1994 | Cohen et al. |
| 5,303,141 A | | 4/1994 | Batchelder et al. ........... 700/29 |
| 5,362,427 A | | 11/1994 | Mitchell, Jr. |
| 5,386,500 A | | 1/1995 | Pomerantz et al. |
| 5,519,816 A | | 5/1996 | Pomerantz et al. |
| 5,555,176 A | | 9/1996 | Menhennett et al. |
| 5,594,652 A | | 1/1997 | Penn et al. |
| 5,635,964 A | | 6/1997 | Burr et al. |
| 5,637,175 A | * | 6/1997 | Feygin et al. ................ 156/264 |
| 5,740,051 A | | 4/1998 | Sanders, Jr. et al. |
| 6,136,252 A | | 10/2000 | Bedal et al. |
| 6,169,605 B1 | | 1/2001 | Penn et al. |
| 6,193,923 B1 | | 2/2001 | Leyden et al. |
| 6,259,962 B1 | | 7/2001 | Gothait |

* cited by examiner

*Primary Examiner*—Laura Edwards
(74) *Attorney, Agent, or Firm*—James E. Curry; Ralph D'Alessandro

(57) ABSTRACT

A cooling system for removing heat from the layers of a three-dimensional object built in a layerwise manner from a build material in a solid freeform fabrication apparatus. The cooling system provides an air duct that delivers a uniform sheet of air flow over the layers of the three-dimensional object while it is built. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

14 Claims, 15 Drawing Sheets

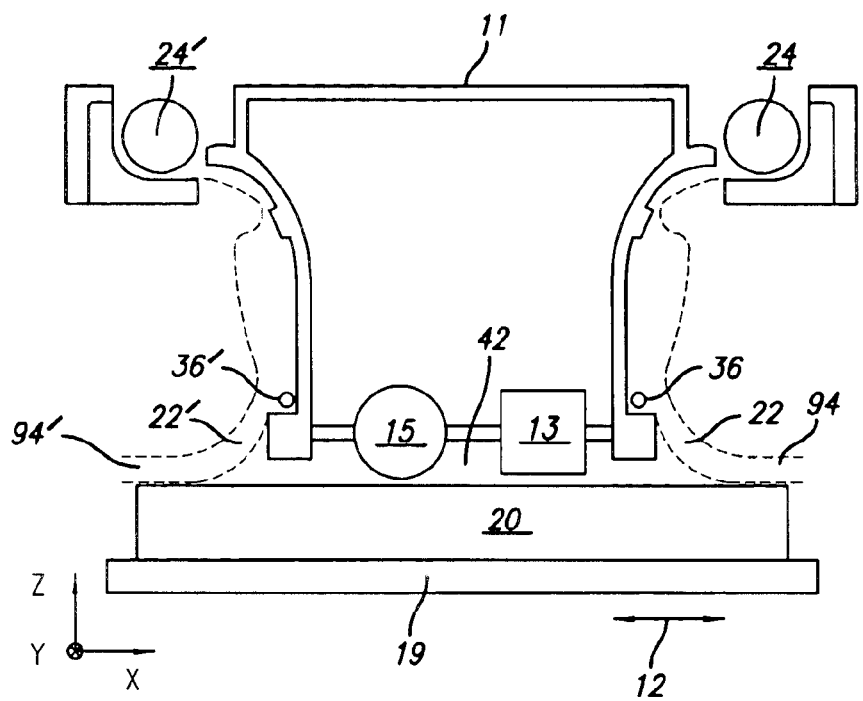
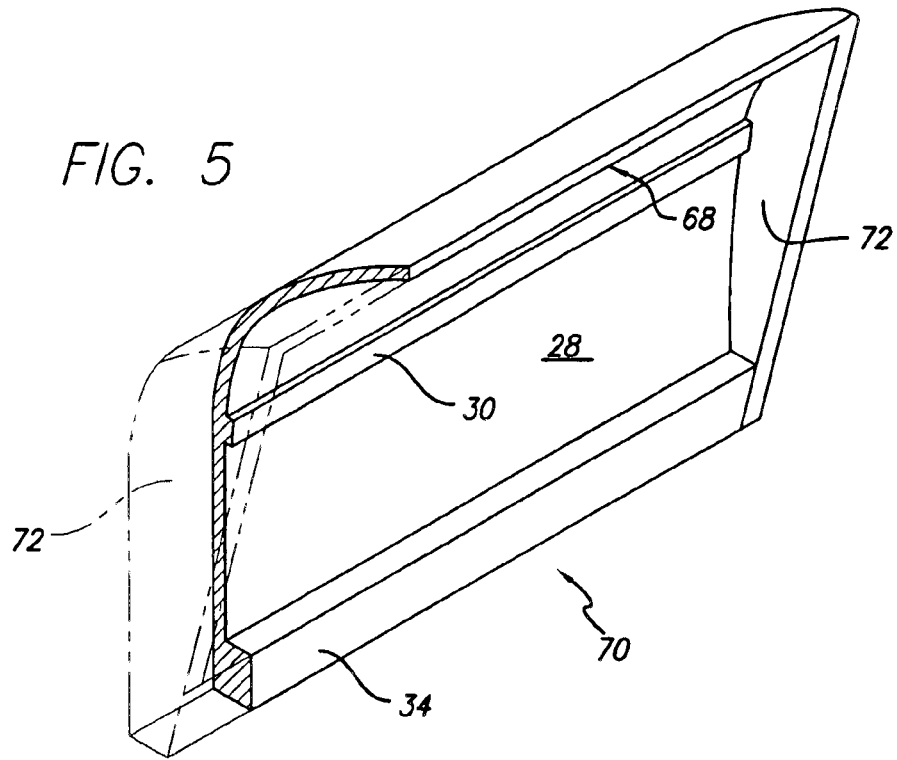

COOLING TECHNIQUES IN SOLID FREEFORM FABRICATION

This is a continuation-in-part of U.S. patent application Ser. No. 10/000,854 filed on Oct. 24, 2001 entitled "Scanning Techniques in Selective Deposition Modeling."

BACKGROUND OF THE INVENTION

1. Field of the Invention

The invention relates in general to solid freeform fabrication and, in particular, to a cooling technique for removing heat from the surface of a an object being formed by a solid freeform fabrication apparatus.

2. Description of the Prior Art

Recently, several new technologies have been developed for the rapid creation of models, prototypes, and parts for limited run manufacturing. These new technologies can generally be described as solid freeform fabrication, herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. In SFF, complex parts are produced from a modeling material in an additive fashion as opposed to conventional fabrication techniques, which are generally subtractive in nature. For example, in conventional fabrication techniques material is removed by machining operations or shaped in a die or mold to near net shape and then trimmed. In contrast, additive fabrication techniques incrementally add portions of a build material to selected locations, typically layer by layer, in order to build a complex part.

SFF technologies typically utilize a computer graphic representation of a part and a supply of a build material to fabricate the part in successive layers. SFF technologies have many advantages over the prior conventional manufacturing methods. For instance, SFF technologies dramatically shorten the time to develop prototype parts and can quickly produce limited numbers of parts in rapid manufacturing processes. They also eliminate the need for complex tooling and machining associated with the prior conventional manufacturing methods, particularly when creating molds for casting operations. In addition, SFF technologies are advantageous because customized objects can be produced quickly by processing computer graphic data.

One category of SFF that has emerged is selective deposition modeling, herein referred to as "SDM." In SDM, a build material is dispensed in a layerwise fashion while in a flowable state and allowed to solidify to form an object. In one type of SDM technology the modeling material is extruded as a continuous filament through a resistively heated nozzle as described, for example, in U.S. Pat. No. 5,303,141 to Batchelder et al. In yet another type of SDM technology the modeling material is jetted or dropped in discrete droplets in order to build up a part. In one particular SDM apparatus, a thermoplastic material having a low-melting point is used as the build material, which is delivered through a jetting system such as those used in ink jet printers. One type of SDM process utilizing ink jet print heads is described, for example, in U.S. Pat. No. 5,555,176 to Menhennett, et al. Hence, there is a variety of dispensing devices available for dispensing build material in SDM applications.

Recently there has developed an interest in dispensing curable phase change materials in SDM. After dispensing the material, the material is cured by exposure to actinic radiation. This produces a substantial amount of heat that must be removed before dispensing the next layer of material so that the next layer will solidify. The amount of heat is significantly greater than that produced when dispensing non-curable materials. As disclosed in U.S. Pat. No. 6,136,252 to Bedal et al., an axial fan is used to direct a flow of cooling air over the layers formed from a non-curable phase change material. The flow is directed perpendicular to the layers and disperses in all directions along the layers. Undesirably, this configuration does not produce a uniform distribution of cooling air across the layers. Further, if flow is increased to remove the additional heat produced by curable materials, the temperature of the material dispensing device is affected. If the temperature of the dispensing device is reduced, so too is the drop mass of the material being dispensed which can result in build failure.

Thus, there is a need in the art to develop a cooling technique capable of uniformly removing a substantial amount of heat generated in the layers of the three-dimensional object formed by SFF. These and other difficulties have been overcome according to the present invention.

BRIEF SUMMARY OF THE INVENTION

The present invention provides its benefits across a broad spectrum of SFF processes by providing a method and apparatus for removing heat from the layers of a three-dimensional object formed in a layerwise manner from a build material. The cooling system comprises at least one fan for generating a flow of air, and at least one air duct in communication with the fan for receiving the flow of air. The air duct shapes the flow of air into a uniform sheet of air flow that is delivered from an exit end of the air duct across the layers of the three-dimensional object. The flow is uniform in that the velocity of the air flow is substantially the same when measured at any location along a transverse direction to the direction of flow at the midpoint of the thickness of the sheet of air flow. The air duct is provided with a protrusion on the exit end for diverting the uniform sheet of air flow away from the air duct and towards the layers of the three-dimensional object. In SDM applications, which dispense a build material from a dispensing device, the protrusion diverts the flow path of the uniform sheet of air flow and has been found to substantially eliminate transient air flows moving toward the dispensing device.

In some embodiments, the air duct comprises a single containment wall for shaping the flow of air into a uniform sheet of air flow. In most of these single containment wall air duct configurations, the flow of air from the fans are bent between the inlet and exit ends of the air duct to bias the air flow against the containment wall as the uniform sheet of air flow is shaped.

In other embodiments, the air duct comprises two containment walls for shaping the flow of air into a uniform sheet of air flow. In most of these dual containment wall configurations, two uniform sheets of air flow are delivered across the layers of the three-dimensional object to effectively double the cooling capacity, when needed.

In most of the embodiments a protrusion is provided upstream from the exit end of the air duct. The sizing of the upstream protrusion adjusts the thickness of the uniform sheet of air flow and the velocity profile of the thickness of the uniform sheet of air flow. The upstream protrusion may or may not be needed depending on the desired air velocity and cooling rate for a particular application.

A variety of fan configurations are provided for generating the flow of air that is delivered to the air duct. The fans can be axial fans, centrifugal fans, mixed flow fans, cross flow fans, and the like. In some embodiments, a plurality of fans are used to generate the air flow used to form the uniform sheet of air flow or multiple uniform sheets of air flow to cool the three-dimensional object being built.

BRIEF DESCRIPTION OF THE DRAWINGS

The present invention method and apparatus will become apparent upon consideration of the following detailed disclosure of the invention, especially when it is taken in conjunction with the accompanying drawings wherein:

FIG. 3 is a diagrammatic side view of another dispensing trolley of the present invention;

FIG. 5 is an isometric diagrammatic view of a curved air duct of the present invention;

To facilitate understanding, identical reference numerals have been used, where possible, to designate identical elements that are common to the figures.

DETAILED DESCRIPTION OF THE PREFERRED EMBODIMENTS

Figure 1:
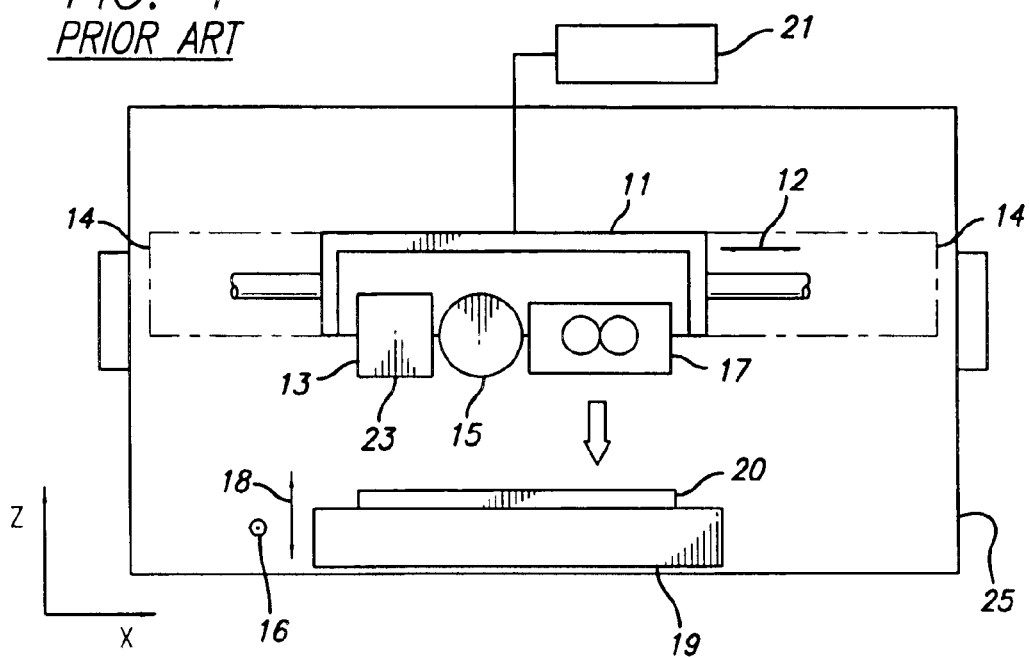
FIG. 1 is a diagrammatic side view of a prior art SDM scanning system producing an axial flow of cooling air.

The present invention provides its benefits across a broad spectrum of SFF processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

While the present invention is applicable to all SFF techniques and objects made therefrom, the invention will be described with respect to solid deposition modeling utilizing a curable phase change build material and phase change support material dispensed in a flowable state. It is to be appreciated that the present invention can be implemented with any SFF technique utilizing a wide variety of materials. For example, the build material can be a photocurable or sinterable material that is heated to a flowable state but when solidified may form a high viscosity liquid, a semi-solid, a gel, a paste, or a solid. In addition, the build material may be a composite mixture of components, such as a mixture of photocurable liquid resin and powder material such as metallic, ceramic, or mineral, if desired. In general, the present invention may be implemented with any SFF technique where a substantial amount of heat transfer is needed to cool the object being formed.

As used herein, the term "a flowable state" of a build material is a state wherein the material is unable to resist shear stresses that are induced by a dispensing device, such as those induced by an ink jet print head when dispensing the material, causing the material to move or flow. Preferably, the flowable state of the build material is a liquid state, however, the flowable state of the build material may also exhibit thixotropic properties. The term "solidified" and "solidifiable" as used herein refer to the phase change characteristics of a material where the material transitions from the flowable state to a non-flowable state. A "non-flowable state" of a build material, as used herein, is a state wherein the material is sufficiently self-supportive under its own weight so as to hold its own shape. A build material existing in a solid state, a gel state, a paste state, or a thixotropic state, are examples of a non-flowable state of a build material for the purposes of discussion herein. Further, the term "cured" or "curable" refers to any polymerization reaction. Preferably the polymerization reaction is triggered by exposure to radiation or thermal heat. Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured, however, once cured, the material cannot transition back to a flowable state and be dispensed by the apparatus.

Additionally, the term "support material" refers to any material that is intended to be dispensed to form a support structure for the three-dimensional objects as they are being formed, and the term "build material" refers to any material that is intended to be dispensed to form the three-dimensional objects. The build material and the support material may be similar materials having similar formulations but, for purposes herein, they are to be distinguished only by their intended use.

Furthermore, the term "main scanning direction" refers to the direction of the reciprocal back and forth motion necessary to dispense material to form three-dimensional objects. The three-dimensional objects are formed by dispensing the materials to specific drop locations on raster or scanning lines aligned in the main scanning direction within the build environment. Generally, each raster line is associated with a discharge orifice of the dispensing device. With reference to the figures, the main scanning direction is the direction of the X-axis of the Cartesian coordinate system shown. The term "secondary scanning direction" refers to the sideways motion necessary to offset the raster lines associated with the discharge orifices of the dispensing device relative to the object being formed so the discharge orifices do not dispense along just one path on the object. With reference to the figures, the secondary scanning direction is the direction along the Y-axis of the Cartesian coordinate system shown. The term "build direction" refers to a direction that is perpendicular to the layers being formed by an SDM apparatus. The apparatus must shift the dispensing device relative to the object staging structure in the build direction as the layers are formed during the build process. With reference to the figures the shift in the build direction is the direction along the Z-axis of the Cartesian coordinate system shown. Further, a "substantially stationary" dispensing device refers to a dispensing device in an apparatus that does not move relative to the apparatus when dispensing material in the mains scanning direction, but may move in the secondary scanning direction and build direction when not dispensing material. The term "object staging structure" refers to any structure capable of supporting a three-dimensional object as it is formed in a layerwise manner by an SDM apparatus. For example, a plate or build platform can be used as an object staging structure, as well as a mesh grating or container, if desired.

In addition, the term a "uniform sheet of air flow" refers to an elongated stream of air flowing in a one direction along a surface such as a layer of a three-dimensional object being formed by any SFF process. The flow is uniform in that the velocity of the air flow is substantially the same when measured at any location along a transverse direction to the direction of flow at the midpoint of the thickness of the sheet of air flow. The velocity of the air flow measured in a transverse direction to the direction of flow along the midpoint of the thickness of the sheet should not vary by more than about 35%, and more preferably by no more than about 10%. Most preferably the velocity of the air flow within the sheet does not vary at all. Since the velocity of the air flow is directly related to the cooling rate of the surface over which it passes, the uniform sheet of air flow provided over the layers of a three-dimensional object formed by SFF helps achieve more consistent cooling for the object.

A conventional SDM scanning methodology is shown in FIG. 1. Generally, the dispensing trolley 11 carries the dispensing device 13, planarizer 15, and cooling fans 17, and is reciprocally driven in the main scanning direction 12 between opposed ends 14 in the build environment 25. The cooling fans 17 direct a cooling stream of air in a direction perpendicular to the layers being formed. Upon contact with the layers the cooling stream spreads out in all directions across the layers. The build platform 19 is offset in the secondary scanning direction 16 for randomizing dispensing and for targeting all locations parallel to the main scanning direction. The secondary scanning direction 16 is represented as a circle and dot in FIG. 1 since it is coincident with the line of sight of that view. The build platform 19 is also shifted in the build direction after each layer is formed. The SDM computer controller or processor 21 coordinates these motions and provides the firing pulses to the dispensing orifices 23 to dispense the material on targeted drop locations on the scanning lines. This conventional scanning technique is discussed, for example, in U.S. Pat. No. 6,136,252 to Bedal et al.

Figure 2:
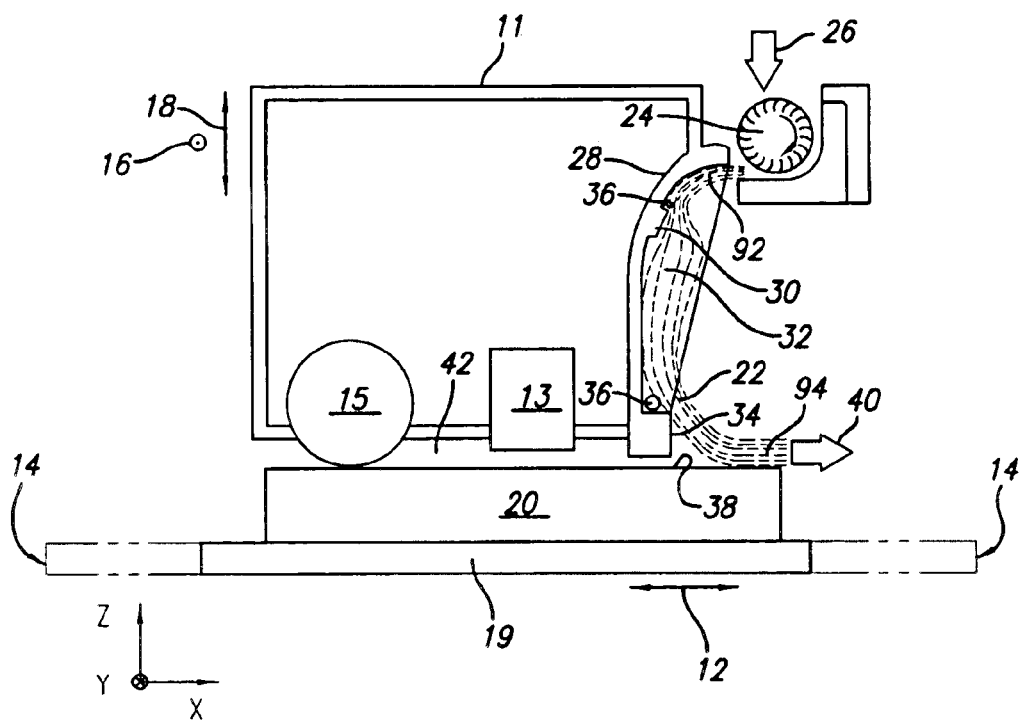
FIG. 2 is a diagrammatic side view of a dispensing trolley of the present invention.
Figure 4:
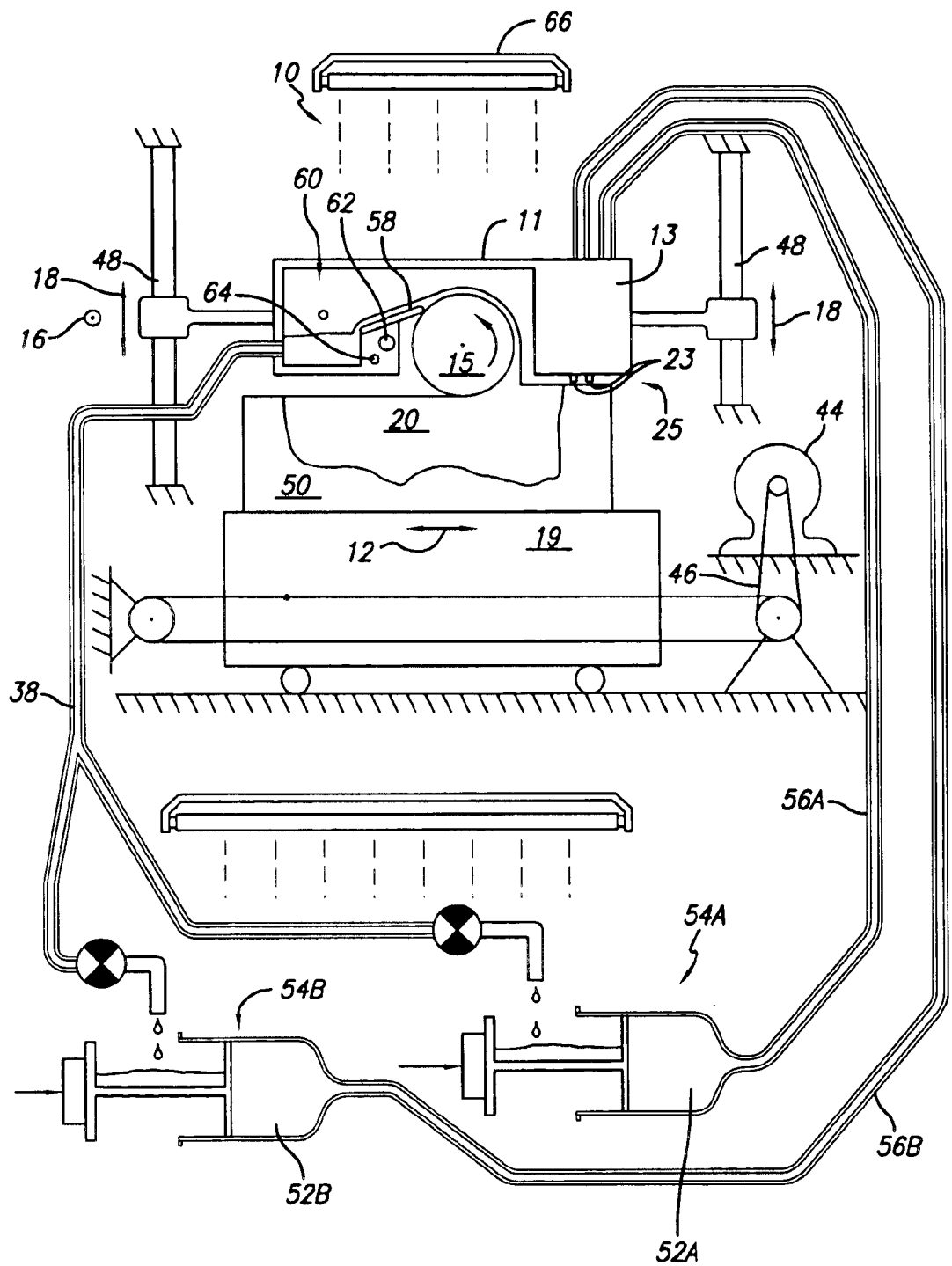
FIG. 4 is a diagrammatic view of an apparatus for practicing the present invention.

Now, referring to FIG. 2, a preferred scanning methodology is shown. The build platform 19 is reciprocally driven in the main scanning direction 12 between opposed ends 14 in the build environment 25, instead of the dispensing trolley 11. The dispensing trolley 11 remains substantially stationary during motion in the main scanning direction. The dispensing trolley is offset in the secondary scanning direction 16 for randomization when the build platform is at the opposed ends 14 of the reciprocating motion in the main scanning direction, and is shifted upward in the build direction after each layer is formed. Alternatively, the build platform may be offset in the secondary scanning direction 16 and shifted downward in the build direction 18, if desired.

Referring to FIG. 2 a flow of air 22 for cooling the object is provided on the dispensing trolley 11. Since a preferred build material is curable by exposure to actinic radiation, a significant amount of heat is generated during the layer formation process. This heat, in addition to the latent heat generated from the material as it transitions into a non-flowable state, must be removed without affecting the temperature of the dispensing device. The conventional cooling fan configuration shown in FIG. 1 provides an air profile in the shape of an inverted "T" that moves vertically downward towards the object and then disperses in all directions over the surface of the object. The inverted "T" air profile is sufficient for cooling objects in the prior SDM systems dispensing non-curable materials. However, increasing the air velocity of the inverted "T" air profile to meet the cooling capacity needed for curable materials undesirably affects the dispensing temperature of dispensing devices such as ink jet print heads used in SDM. As the dispensing temperature drops, so to does the drop mass of the dispensed material. Thus, non-uniform temperature distributions around the print head create non-uniform drop mass of ejected material droplets across the print head array. In addition, prior scanning techniques that reciprocate the print head throughout the build environment also contribute to this problem.

In order to maintain a uniform dispensing temperature across the dispensing device 13 it is desirable to substantially eliminate the transient convection air flows occurring around the print head while also providing the necessary cooling air flow rates required for removing heat from the layers of the object being formed. Referring to FIG. 2, a flow of air 22 for cooling the object is provided on the dispensing trolley 11. The flow of air 22 is directed away from the dispensing device 13 in the shape of a uniform sheet of air flow 94 over the surface of the object 20 being formed below. Cooling air enters a fan or blower 24 as indicated by arrow 26. In the embodiment shown, the fan 24 is a centrifugal fan that is elongated and extends the entire length of the dispensing device 13 in the Y-direction, which is coincident with the line of sight of FIG. 2. Alternatively, the fan may be an axial fan, a mixed flow fan, a cross flow fan, or the like. The fan or blower 24 ejects the air outwardly in a horizontal manner as a sheet of air shown by numeral 92 towards a curved air duct 28 which re-directs the sheet of air vertically downward toward the object 20 being formed. The flow of air 92 is shaped into a substantially uniform sheet of air 94 so that uniform cooling can be provided by convection across the surface of the layers. A protrusion 30 is provided to initially trip the flow of air to thicken the width of the sheet as shown at 32, which in turn thickens the width of the sheet in the area indicated by numeral 22. At the exit end of the air duct 28 there is another protrusion 34. The protrusions 34 and 30 establish high pressure zones 36, which impart a sideways force on the stream of air that diverts the stream air flow away from the dispensing device 13. The diverted flow path of the sheet of air is shown by numeral 22. The point where the uniform sheet of air flow 94 traverses the surface of the object 20 is shown by numeral 38. Heat is transferred by convection from the object 20 to the air flow, which travels away from the object and dispensing device in the direction noted by numeral 40. The uniform sheet of air flow 94 is directed away from the dispensing device 13 to substantially prevent active cooling of the dispensing device 13. This is true even when the air flow does not traverse the object 20, such as when the build platform 15 is located at the left opposed end 22 in FIG. 8. However, as the build platform 15 moves from right to left, the uniform sheet of air flow 94 is directed across the surface 38 of the object 20.

The protrusion 34, which diverts the flow path of the uniform sheet of air flow, has been found to substantially eliminate transient air flow moving toward the dispensing device. Experiments were conducted wherein a flow of air from a flat air duct was provided at an inclined angle to the object surface in order to eliminate transient air flow moving backwards toward the dispensing device. The inclined angle was intended to direct the air flow away from the dispensing device. However, these experiments revealed that transient air flow still migrated backwards to the dispensing device, and could not be substantially eliminated. Thus, it is believed that the provision of the protrusion on the exit end of the air duct to divert the uniform sheet of air flow prevents transient air flow from migrating toward the dispensing device.

With the uniform sheet of air flow being directed away from the dispensing device 13, the velocity of the air flow can be substantially increased in order to achieve the desired heat transfer rate necessary for removing the heat being released from the layers of three-dimensional object. In addition, with the print head positioned between the uniform sheet of air flow 94 and the planarizer 15, a pocket of air 42 is established around the dispensing device 13. This pocket or buffer zone of air 42 is substantially undisturbed within the apparatus and provides an insulating or shielding effect around the dispensing device 13. This in turn allows for more uniform temperature control of the dispensing device.

The dispensing trolley 11 in FIG. 2 shows just one uniform sheet of air flow 94 for cooling the object 20. In the embodiment shown in FIG. 3, a second uniform sheet of air flow 94' for cooling the object is provided adjacent to the planarizer 15 on the left side of the dispensing trolley 11. The second uniform sheet of air flow 94' is the mirror image of the one shown in FIG. 2 and has its own fan 24' for generating the air flow. The second uniform sheet of air flow 94' is diverted outwardly to the left. Utilizing two uniform sheets of air flows effectively doubles the convention heat transfer capabilities of the system. This configuration is desirable when just one uniform sheet of air flow is insufficient to remove the heat from the layers of the object 20 formed within the SDM apparatus. Furthermore it is to be appreciated that the configuration of the uniform sheets of air flows may also be implemented on the dispensing device 11 of the prior art scanning methodology shown in FIG. 1, if desired.

Referring to FIG. 4 there is illustrated generally by the numeral 10 a solid freeform fabrication apparatus for practicing the present invention. The build platform 19 is reciprocally driven by the conventional drive means and motor 44, instead of the dispensing trolley 11 shown in FIG. 1. A gear reduction means 46 is provided so that the motor 44 can be driven at a high speed under low torque conditions. This eliminates the control problems associated with accelerating and decelerating a varying mass. The dispensing trolley 11 is precisely positioned by actuation means 48 in the build direction to adjust for each layer of the object 20 as it is formed. The actuation means 48 comprises precision lead screw linear actuators driven by servomotors (both not shown). The ends of the linear actuators of the actuation means 48 reside on opposite ends of the build environment 25 and in a transverse direction to the direction of reciprocation of the build platform. In this transverse direction, which is in line with the secondary scanning direction 16, the dispensing trolley 11 is shifted to execute randomization as discussed previously. However, for ease of illustration in FIG. 4, the linear actuators and dispensing trolley are shown in a two-dimensionally flat manner giving the appearance that the linear actuators are aligned in the direction of reciprocation of the build platform 19. Although they may be aligned with the direction of reciprocation, the use of space within the apparatus is optimized by situating them in a transverse direction to the reciprocation in the main scanning direction.

In the build environment generally illustrated by numeral 25, there is shown by numeral 20 a three-dimensional object being formed with integrally formed supports 50. The object 20 and supports 50 both reside in a sufficiently fixed manner on the build platform 15 so as to withstand the acceleration and deceleration forces induced during reciprocation of the build platform while still being removable from the platform. This is achieved by dispensing at least one layer of support material on the build platform before dispensing the build material since the support material is designed to be removed at the end of the build process. The material identified by numeral 52A is dispensed by the apparatus 10 to form the three-dimensional object 20, and the material identified by numeral 52B is dispensed to form the support 50. Containers identified generally by numerals 54A and 54B respectively hold a discrete amount of these two materials 52A and 52B. Umbilicals 56A and 56B respectively deliver the material to the dispensing device 13, which in the embodiment shown is an ink jet print head having a plurality of dispensing orifices 23.

The dispensing trolley 11 shown in FIG. 4 comprises a heated planarizer 15 that removes excess material from the layers to normalize the layers being dispensed. The heated planarizer 15 contacts the material in a non-flowable state and because it is heated, locally transforms some of the material to a flowable state. Due to the forces of surface tension, this excess flowable material adheres to the surface of the planarizer, and as the planarizer rotates the material is brought up to the skive 58 which is in contact with the planarizer 15. The skive 58 separates the material from the surface of the planarizer 15 and directs the flowable material into a waste reservoir identified generally by numeral 60 located on the trolley 11. A heater 62 and thermistor 64 on the waste reservoir 60 operate to maintain the temperature of the waste reservoir at a sufficient level so that the waste material in the reservoir remains in the flowable state. The dispensing trolley 11 is configured to have two uniform sheets of air flows for cooling the object as shown in FIG. 3, however the air flows have been omitted in FIG. 4 for ease of illustration.

In the apparatus shown in FIG. 4, the build material 52A is a phase change material that is cured by exposure to actinic radiation. After the curable phase change material 52A is dispensed in a layer it transitions from the flowable state to a non-flowable state. After a layer has been normalized by the passage of the planarizer 15 over the layer, the layer is then exposed to actinic radiation by radiation source 66. Preferably the actinic radiation is in the ultraviolet or infrared band of the spectrum. For this SDM apparatus, planarizing occurs prior to exposing a layer to the radiation source 66. This is because the planarizer shown can only normalize the layers if the material in the layers can be changed from the non-flowable to the flowable state, which cannot occur if the material 52A has been already cured by exposure to radiation. However, the planarizer may be replaced with a mill cutter or similar device that chips or grinds the layers smooth, which could normalize the layers even after they have been cured, if desired.

In conjunction with the curable build material 52A, a non-curable phase change material 52B is used for forming the support 50. Since the support material cannot be cured, it can be removed from the object and build platform, for example, by being dissolved in a solvent or by being melted by application of heat. A preferred method for removing the support material is disclosed in U.S. patent application Ser. No. 09/970,727 filed Oct. 3, 2001 entitled "Post Processing Three-Dimensional Objects Formed by Selective Deposition Modeling", now U.S. Pat. No. 6,752,948. A preferred method for dispensing a curable phase change material to form a three-dimensional object and for dispensing a non-curable phase change material to form supports for the object is disclosed in U.S. patent application Ser. No. 09/971,337 filed Oct. 3, 2001 entitled "Selective Deposition Modeling with Curable Phase Change Materials." A preferred curable phase change material and non-curable phase change support material is disclosed in U.S. patent application Ser. No. 09/971,247 filed Oct. 3, 2001 entitled "Ultra-Violet Light Curable Hot Melt Composition." A preferred material feed and waste is disclosed in U.S. patent application Ser. No. 09/970,956, filed Oct. 3, 2001 entitled "Quantized Feed System." All of these related applications are incorporated by reference in their entirety herein.

The air duct 28 is shown in further detail in FIG. 5. The air duct 28 has an inlet end identified generally by numeral 68 and exit end identified generally by numeral 70. The air duct has guide walls 72 extending between the inlet end and exit end which constrain the flow of air traveling through the air duct to prevent the flow of air from fanning out as the air exits from the air duct 28. The air duct 28 shown in FIG. 5 forms a single containment wall that is curved so as to bend the air flow approximately 90 degrees as it travels from the inlet end to the exit end. Because the curvilinear motion of the air flow imparts a centrifugal force that acts against the air duct 28, the air flow is biased against the air duct as it travels from the inlet end 68 to the exit end 70. Hence, the air duct configuration shown in FIG. 5 does not need an additional containment wall to form the uniform sheet of air flow.

Figure 18:
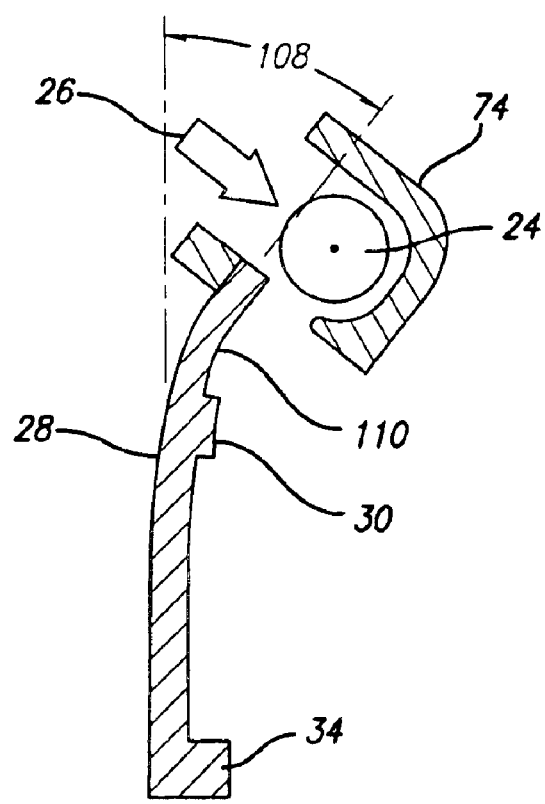
FIG. 18 is a cross-sectional view of another embodiment of the present invention cooling system.

It is not necessary for the air duct comprising a single containment wall to bend the air 90 degrees as it travels from the inlet end to the exit end of the duct to establish the uniform sheet of air flow. Referring to FIG. 18, the bend angle of the air duct 28, identified by numeral 108, can be significantly less than 90 degrees, such as about 10 degrees or less, if desired. In addition, the bend angle can be greater than 90 degrees, such as up to 180 degrees, if desired. Whatever bend angle 108 is used, a large bend radius 110 along the containment wall will provide for a uniform sheet of air flow traveling along the surface of the air duct between the inlet and exit ends. The large bend radius further assists the shaping of the uniform sheet of air flow for cooling the layers of the object being formed. However, the air duct may also be substantially straight as long as the air duct is provided with a uniform sheet of air flow directly from the fan or fans that generate the air flow.

Figure 6A:
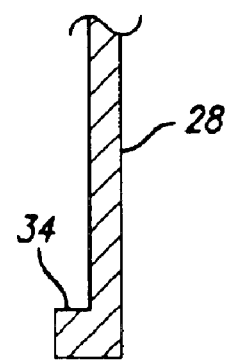
FIGS. 6A–6I are cross-sectional views of alternative air duct profiles of the present invention.
Figure 6B:
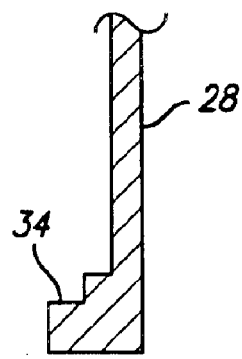
Figure 6C:
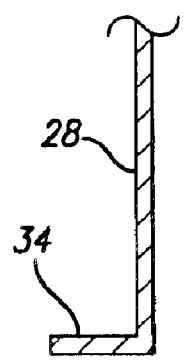
Figure 6D:
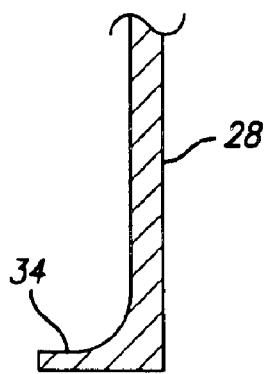
Figure 6E:
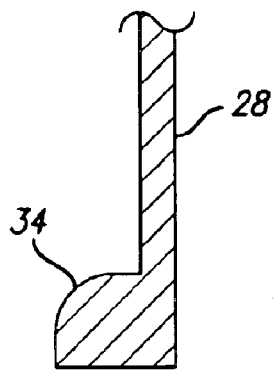
Figure 6F:
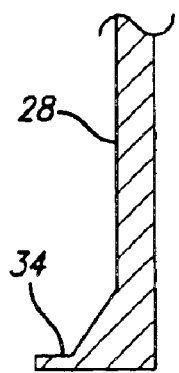
Figure 6G:
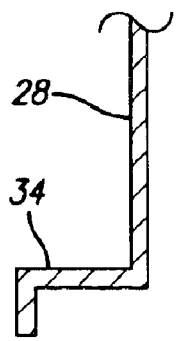
Figure 6H:
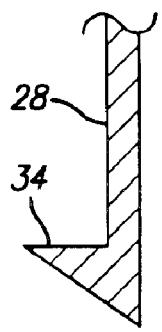
Figure 6I:
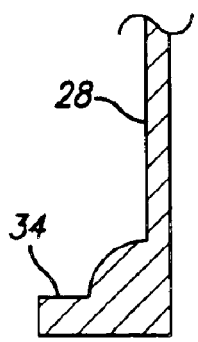

In FIG. 5 the protrusion 34 which establishes the high pressure zone 36 to divert the air flow is square in cross-section, however other configurations may be used as well. Referring to FIGS. 6A through 6I a number of alternative configurations for the shape of the protrusion 34 are shown. In FIG. 6A, the protrusion 34 is square in cross section as in FIG. 5. In FIG. 6B, a double step configuration is shown while in FIG. 6C the protrusion 34 is a tab extending generally perpendicular at the end of the air duct 28. Still further, FIGS. 6D, 6E, and 6I show alternative configurations incorporating either a convex or concave radius on the protrusion 34. In FIG. 6F a chamfered configuration is shown and in FIG. 6H a reverse chamfer configuration is shown. In FIG. 6G a double sided tab configuration is shown. Other configurations and combinations of shapes for the protrusion are possible as well, such as polygonal shapes, elliptical shapes, and the like.

Figure 7:
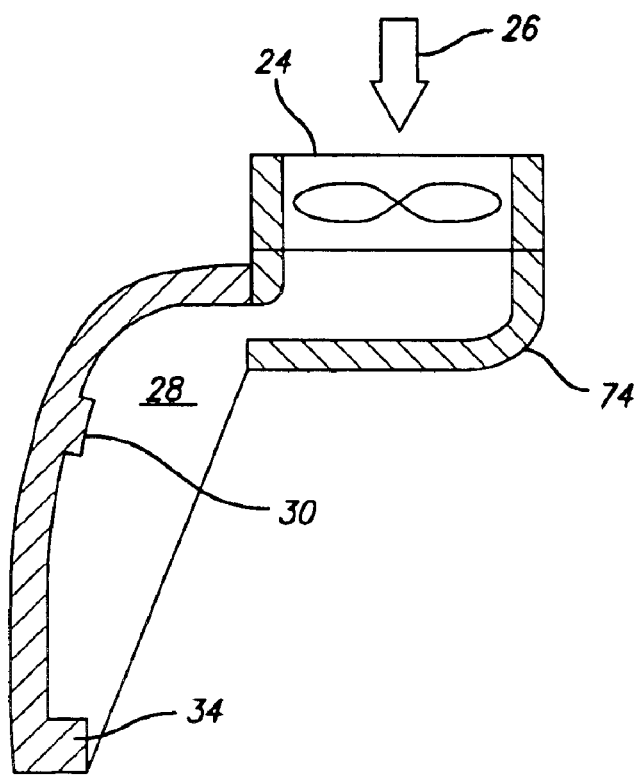
FIG. 7 is a cross-sectional view of an embodiment of the present invention cooling system.
Figure 8:
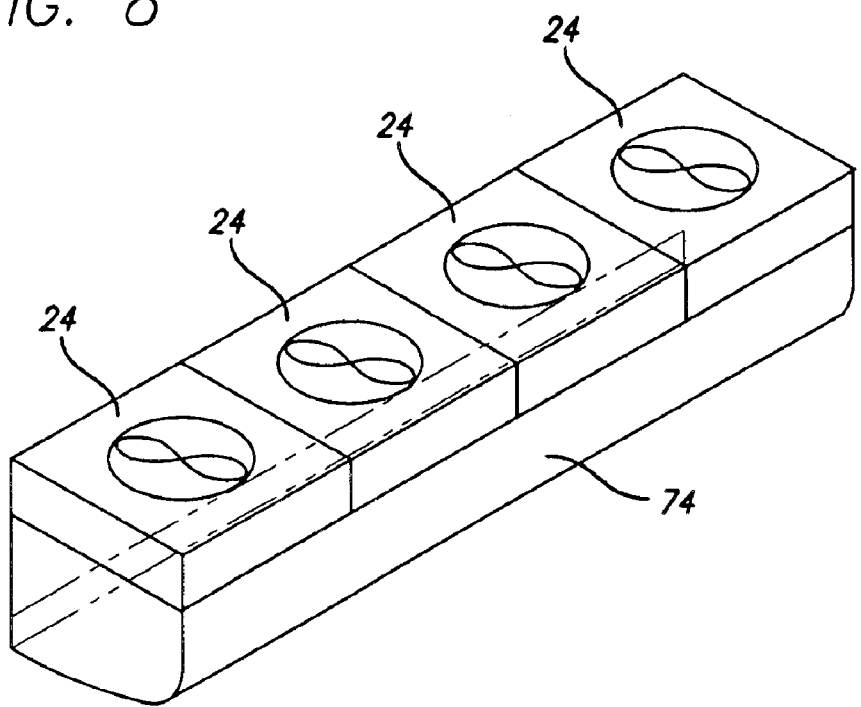
FIG. 8 is an isometric diagrammatic view of the embodiment of FIG. 7.

Another embodiment of the present invention cooling system is shown in FIGS. 7 and 8. The air duct 28 in this embodiment is the same as the one shown in FIG. 5, however a plurality of fans 24 are used. The fans 24 are arrayed above a cowling 74 which directs the air 26 drawn through the fans 24 towards the air duct 28 through opening 76. In this embodiment the fans 24 are axial fans used in conjunction with the cowling 74 to generate the flow of air delivered to the air duct 28, instead of the elongated centrifugal fan configuration shown in FIGS. 2 and 3. The cowling may include guide vanes (not shown) to direct the flow of air in a single direction towards the air duct 28. Further, guide vanes may also be provided on the air duct 28, if needed. It may also be desirable to stagger the direction of rotation of the fans, for example, by rotating one fan clockwise and an adjacent fan counter clockwise so as to minimize spiraling effects in the air flow stream.

Figure 9:
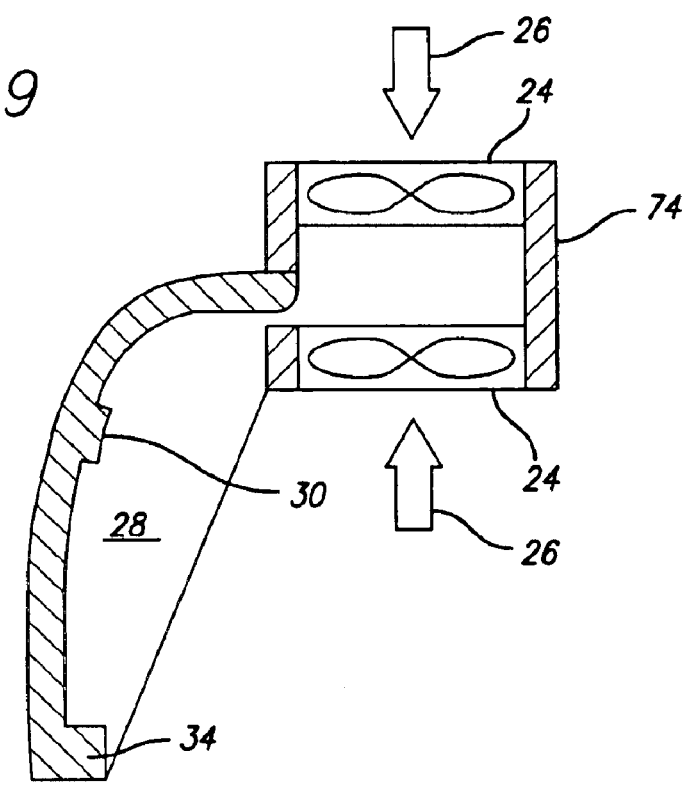
FIG. 9 is a cross-sectional view of another embodiment of the present invention cooling system.
Figure 10:
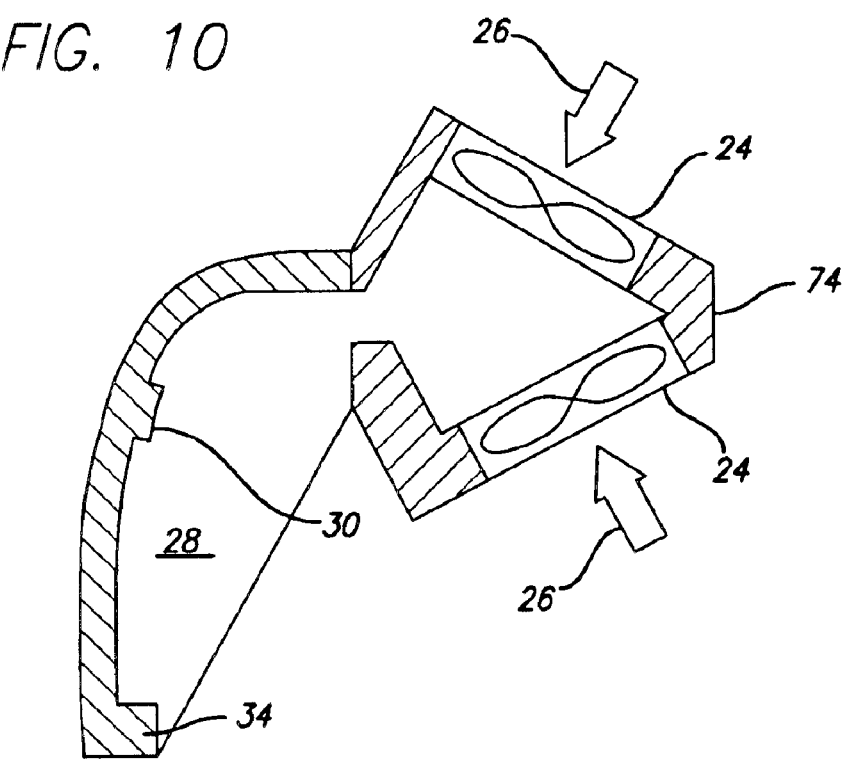
FIG. 10 is a cross-sectional view of another embodiment of the present invention cooling system.

Another embodiment of the present invention cooling system is shown in FIG. 9. In this embodiment two arrays of axial fans 24 generate the flow of air that is delivered to the air duct 28 through a cowling 74. Two separate openings draw in the air 26 to form the air flow. Another embodiment having a double array of axial fans 24 is shown in FIG. 10 where the cowling 74 positions the fans 24 at an angle as opposed to the parallel configuration shown in FIG. 9.

Figure 11:
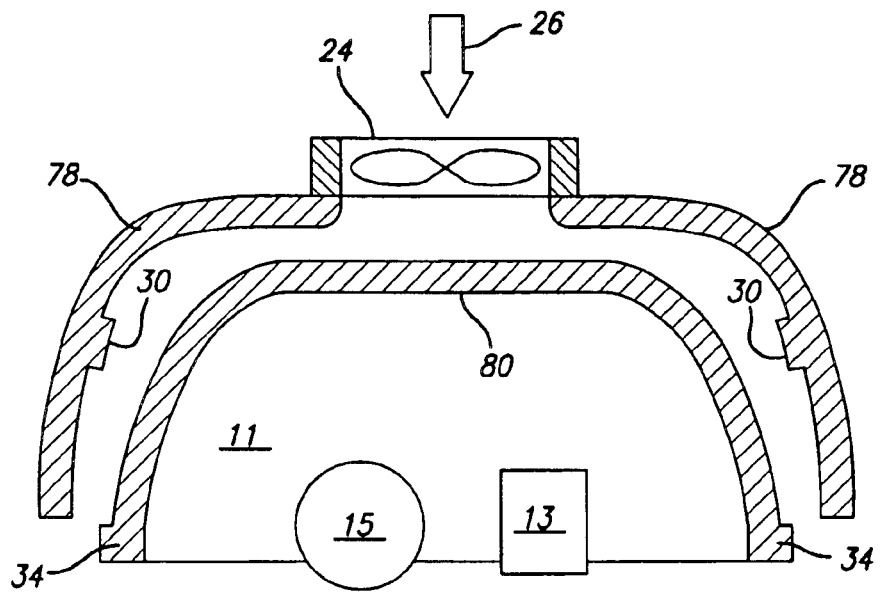
FIG. 11 is a cross-sectional view of another embodiment of the present invention cooling system.
Figure 12:
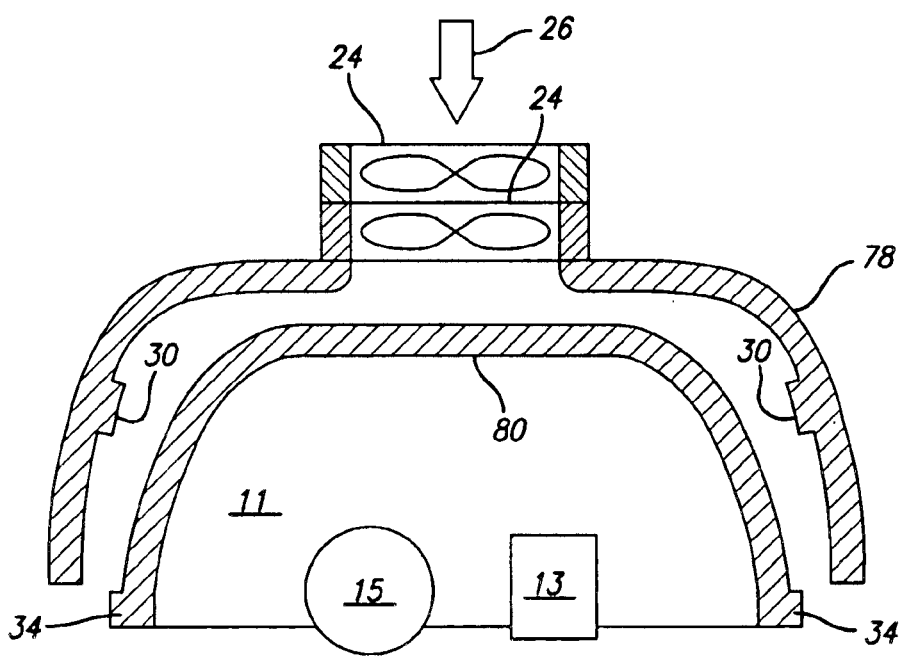
FIG. 12 is a cross-sectional view of another embodiment of the present invention cooling system.
Figure 13:
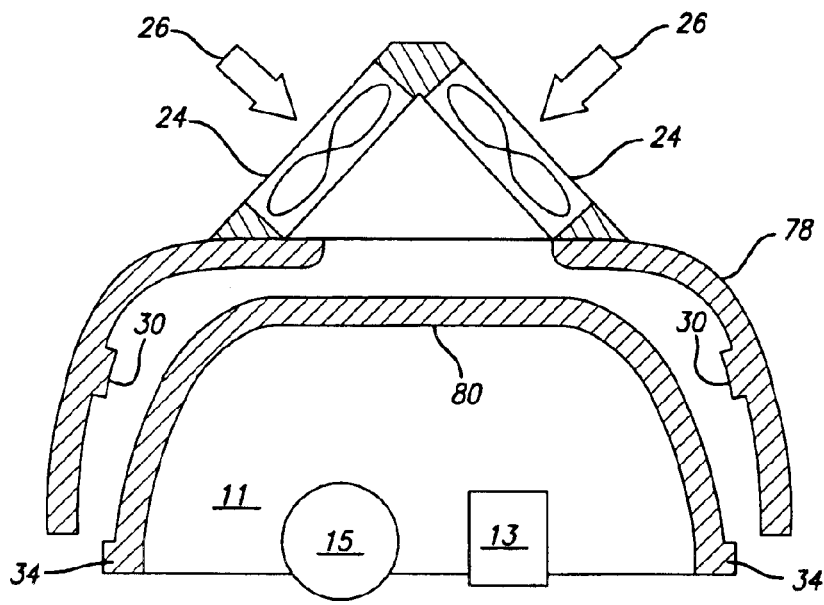
FIG. 13 is a cross-sectional view of another embodiment of the present invention cooling system.
Figure 14:
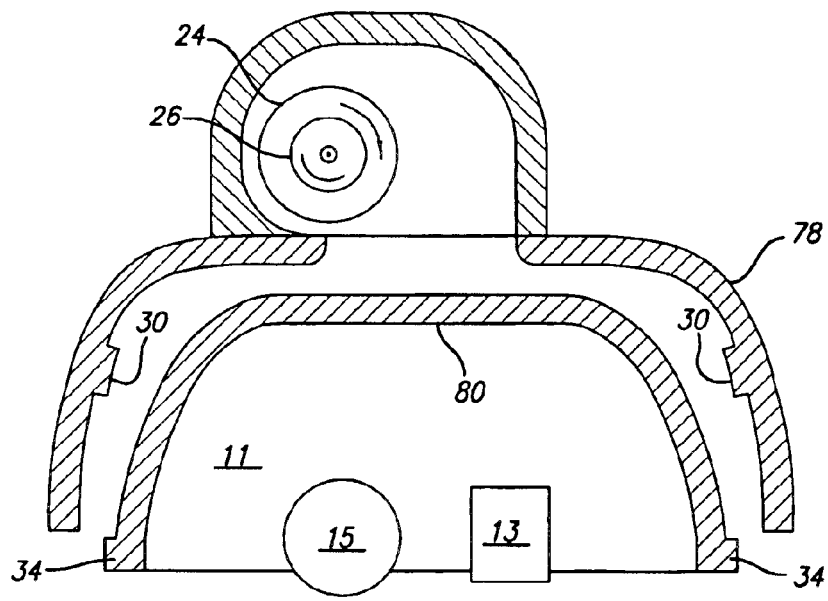
FIG. 14 is a cross-sectional view of another embodiment of the present invention cooling system.
Figure 15:
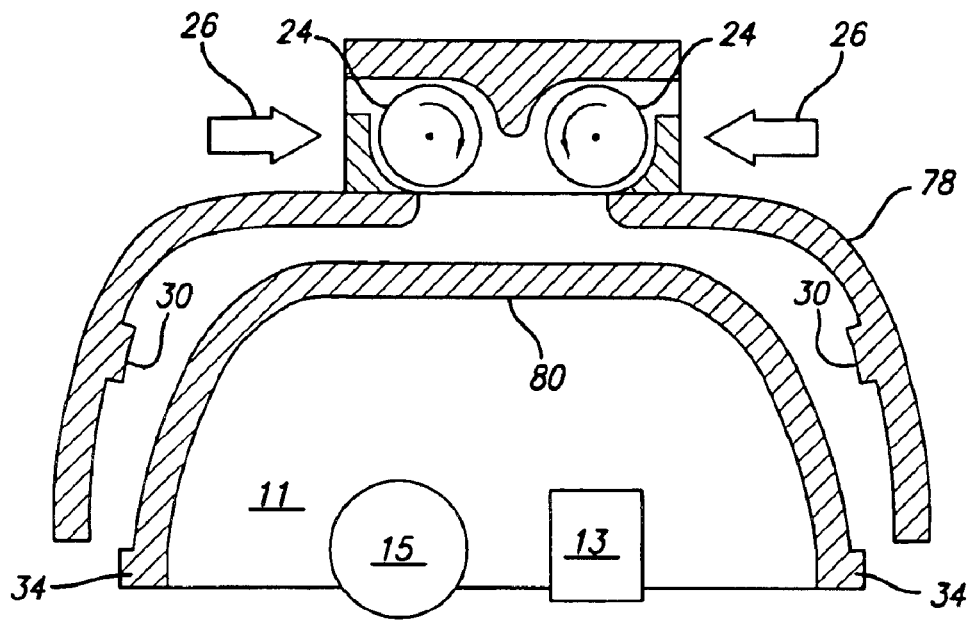
FIG. 15 is a cross-sectional view of another embodiment of the present invention cooling system.

Another embodiment of the present invention cooling system is shown in FIG. 11 in conjunction with a dispensing trolley 11 carrying a dispensing device 13 and planarizer 15. In this embodiment, the air duct comprises a first containment wall 78 and second containment wall 80 which function to form two uniform sheets of air flows similar to those shown in FIG. 3. However, in this embodiment an array of axial fans 24 is provided to generate a flow of air that is divided in two to form two uniform sheets of air flow. Further, the protrusion 30 that widens the thickness of the uniform sheets of air flow is located on the first guide wall and the protrusion 34 that diverts the sheets away from the dispensing device is located on the ends of the second guide wall 80. Four embodiments similar to the one shown in FIG. 11 are shown in FIGS. 12, 13, 14, and 15. These embodiments possess a similar air duct structure, however, they employ different fan configurations for generating the air flow. In FIG. 12, a double stacked array of axial fans 24 are used to generate the air flow needed to form the uniforms sheets of air flows. In the embodiment shown in FIG. 13, two separate arrays of axial fans 24 are used to generate the air flow needed. In FIG. 14 a centrifugal fan 24 is used having an axial air inlet 26 that is coincident with the line of sight in the view. Further, the embodiment shown in FIG. 15 comprises two elongated centrifugal fans 24 for generating the air flow needed. When centrifugal fans are used, they can have straight radial blades, curved forward blades, curved backward blades, or straight backward blades. In addition, other fan types can be used as well, such as mixed flow fans and cross flow fans, if desired.

It is to be appreciated that when forming the air duct with two containment walls, the flow of air need not be bent as it travels from the inlet end to the exit end of the air duct when forming the uniform sheet of air flow. Hence, the containment walls may be substantially straight instead of being curved, as are shown in the air duct configurations in FIGS. 11, 12, 13, 14, and 15.

Figure 16A:
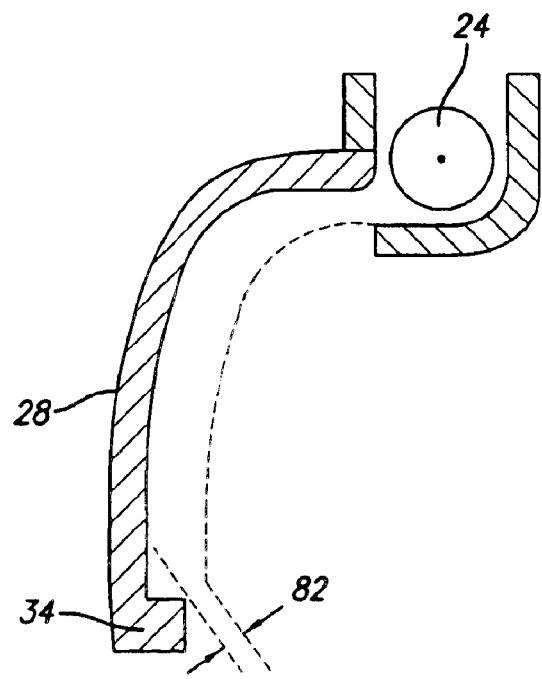
FIGS. 16A and 16B are cross-sectional views showing the change in thickness of the uniform sheet of air flow when a protrusion is provided upstream on the air duct.
Figure 16B:
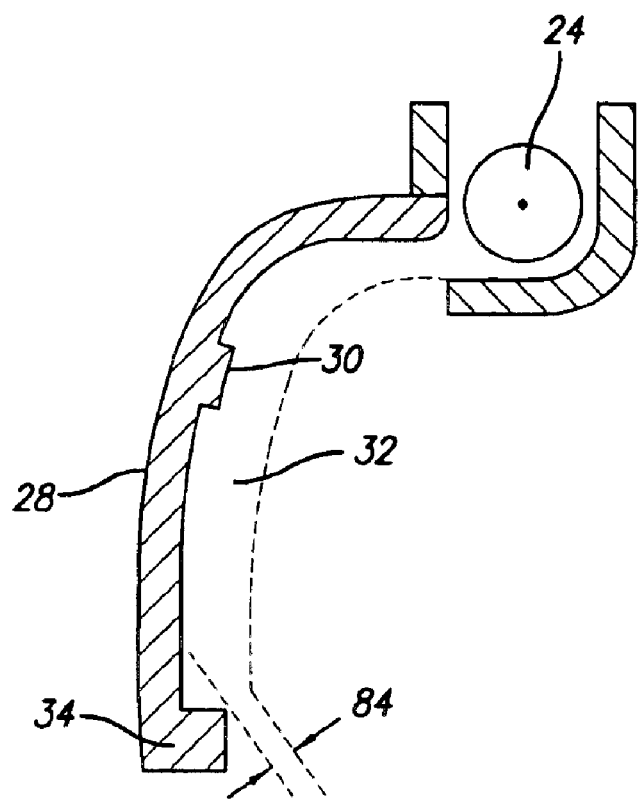
Figure 17A:
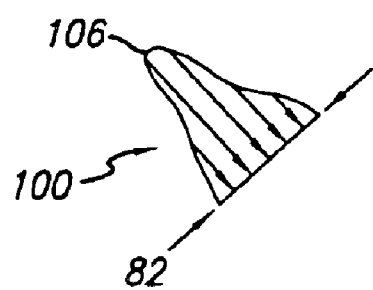
FIG. 17A and FIG. 17B are respective air velocity profiles of the thickness of the uniform sheet of air flows shown in FIGS. 16A and 16B.
Figure 17B:
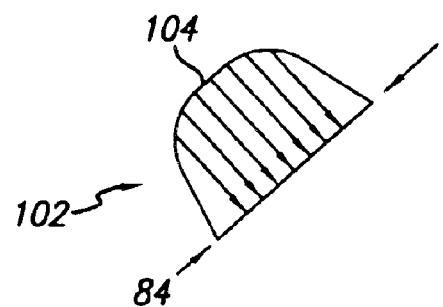

Now referring to FIGS. 16A, 16B, and 17A, 17B the effect on the thickness of the uniform sheet of air flow by the provision of the protrusion 30 is shown. FIG. 16A shows air duct 28 without the protrusion upstream from the exit end of the air duct. Without the upstream protrusion, the thickness 82 for the uniform sheet of air flow adjacent protrusion 34 is established as shown. The velocity profile of the sheet of air flow taken at thickness 82 is shown in FIG. 17A by numeral 100. The same air duct is shown including the protrusion 30 upstream from the exit end of the air duct 28 is shown in FIG. 16B. As discussed in conjunction with FIG. 2, the protrusion 30 triggers the air flow to widen just after the protrusion, as indicated by numeral 32. The widening of the air flow caused by the protrusion 30 also widens the thickness 84 of the uniform sheet of air flow adjacent the protrusion 34 compared to the thickness 82 of the air flow without the protrusion. The velocity profile of the sheet of air flow taken along the thickness 84 is shown in FIG. 17A by numeral 102. As shown in FIGS. 17A and 17B, the velocity profile is more uniform across the thickness of the sheet of air flow when the upstream protrusion is provided. Further, the peak air velocity of the profile, identified by numeral 104 in FIG. 17B and by numeral 106 in FIG. 17A, is less when the upstream protrusion is provided on the air duct. Normally the peak air velocity of the profile will reside generally at the midpoint of the thickness of the sheet of air flow. According to the present invention, the peak air velocity remains substantially the same when measured at any location along a transverse direction to the direction of flow. However, lowering the peak air velocity of the profile may be needed in order to prevent damage to the object being formed, and particularly when forming geometrically fragile objects under optimal cooling rates. Thus, the protrusion 30 can be used to optimally adjust the thickness of the uniform sheet of air flow and the velocity profile of the thickness of the uniform sheet of air flow as may be needed depending on the desired air velocity and cooling rate for a particular application. However, not all applications will need the upstream protrusion according to the present invention.

Figure 19:
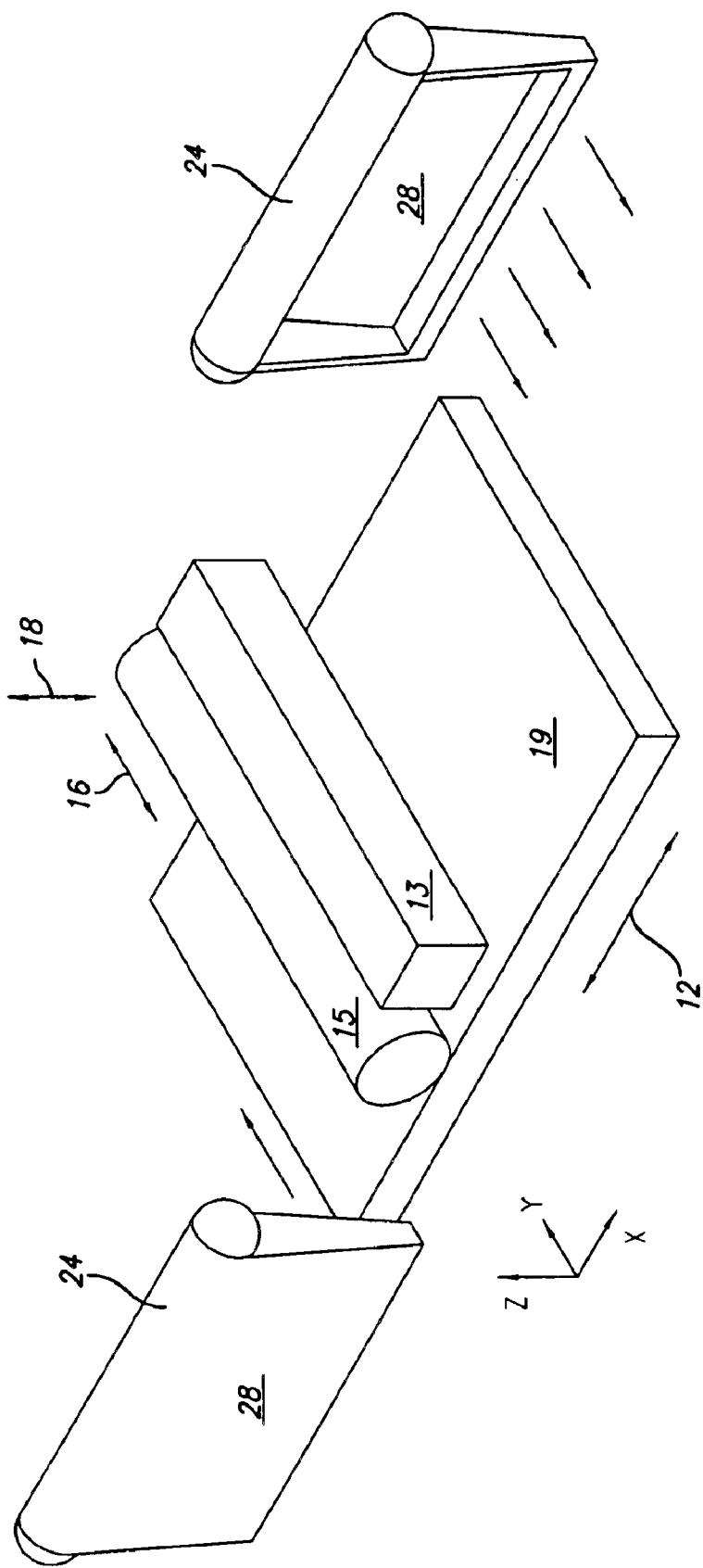
FIG. 19 is an isometric diagrammatic view of another embodiment of the present is invention cooling system.

Referring to FIG. 19 another alternative embodiment of the present invention cooling system is shown. In this embodiment two separate uniform sheets of air flow are provided which are directed substantially parallel to the secondary scanning direction 16. The two cooling systems represented by air ducts 28 and centrifugal fans 24 need not be mounted on the dispensing trolley with the dispensing device 13 and planarizer 15 as in the other embodiments.

Figure 20:
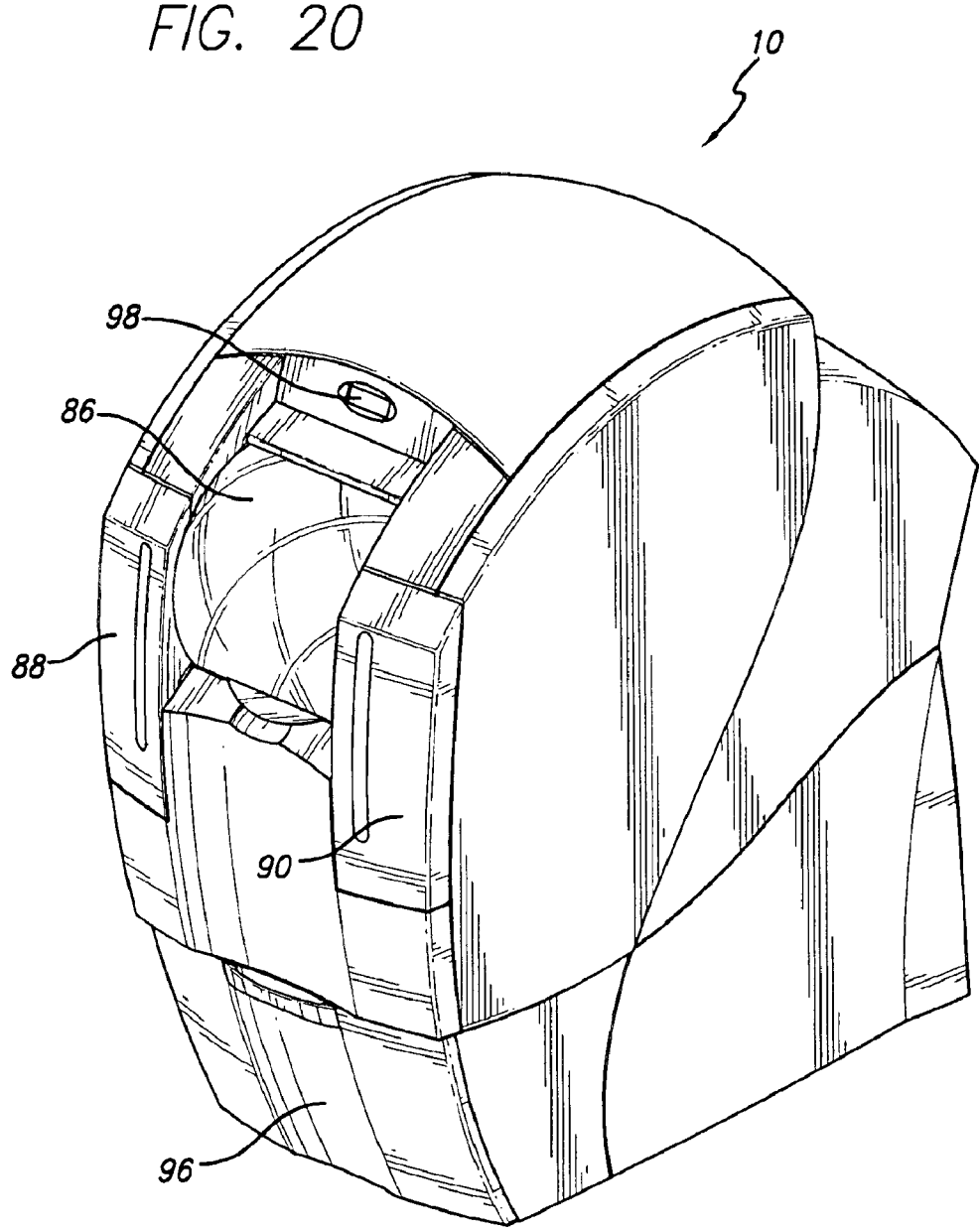
FIG. 20 is an isometric diagrammatic view of an apparatus adapted for practicing the present invention.

Now referring to FIG. 20, an SDM apparatus is shown at 10 for practicing the present invention. To access the build environment, a slideable door 86 is provided at the front of the apparatus. The object can be easily removed when the build platform (not shown) is positioned at the opposed end of reciprocation adjacent slideable door 86. The door 86 does not allow radiation within the machine to escape into the environment. The apparatus is configured such that it will not operate or turn on when the door 86 open. In addition, when the apparatus is in operation the door 86 will not open. A build material feed door 88 is provided so that the build material can be inserted into the apparatus 10. A support material feed door 70 is also provided so that the support material can be inserted into the apparatus 10. A waste drawer 90 is provided at the bottom end of the apparatus 10 so that the expelled waste containers can be removed from the apparatus. A user interface 98 is provided which is in communication with the external computer 35 previously discussed which tracks receipt of the print command data from an external computer.

What have been described are preferred embodiments in which modifications and changes may be made without departing from the spirit and scope of the accompanying claims.

What is claimed is:

1. A method of forming a three-dimensional object in a layerwise manner from a build material, the method comprising:

providing object layer data;

forming layers of the three-dimensional object according to the object layer data; and providing at least one substantially uniform sheet of air flow across the layers of the three-dimensional object to remove heat from the layers of the three-dimensional object, the uniform sheet of air flow being established by directing a flow of air along an air duct, the air duct having a protrusion diverting the air flow away from the air duct and towards the layers of the three-dimensional object.

2. The method of claim 1 further comprising:

forming the layers of the three-dimensional object by dispensing the build material from a dispensing device; and directing the uniform sheet of air flow away from the dispensing device.

3. The method of claim 2 further comprising:

establishing reciprocal motion in a main scanning direction relatively between the three-dimensional object and the dispensing device; and wherein the substantially uniform sheet of air flow is directed substantially parallel to the main scanning direction.

4. The method of claim 2 further comprising:

establishing motion in a secondary scanning direction relatively between the three-dimensional object and the dispensing device; and wherein the substantially uniform sheet of air flow is directed substantially parallel to the secondary scanning direction.

5. The method of claim 2 further comprising:

establishing a substantially undisturbed pocket of air around the dispensing device by directing the air flow away from the dispensing device.

6. A method of forming a three-dimensional object in a layerwise manner from a build material, the method comprising:

providing object layer data;

forming layers of the three-dimensional object according to the object layer data; and providing at least two substantially uniform sheets of air flow across the layers or the three-dimensional object wherein the uniform sheets of air flow are established by directing a flow of air along a air duct having an inlet end and exit end, the air duct having a protrusion on the exit end, the protrusion diverting the flow of air away from the air duct and toward the layers of the three-dimensional object.

7. The method of claim 6 further comprising:

forming the layers of the three-dimensional object by dispensing the build material from a dispensing device; and establishing a substantially undisturbed pocket of air around the dispensing device by positioning the substantially uniform sheets of air flow on opposed sides of the dispensing device and diverting each sheet of air flow away from the dispensing device.

8. The method of claim 7 further comprising:

establishing reciprocal motion in a main scanning direction relatively the three-dimensional object and the dispensing device; and wherein the substantially uniform sheets of air flow are directed in opposite directions that are substantially parallel to the main scanning direction.

9. The method of claim 7 further comprising:

establishing motion in a secondary scanning direction relatively between the three-dimensional object and the dispensing device; and wherein the substantially uniform sheets of air flow are directed substantially parallel to the secondary scanning direction.

10. A method of forming a three-dimensional object in a layerwise manner from a build material, the method comprising:

providing object layer data;

forming layers of the three-dimensional object according to the object layer data;

providing at least one substantially uniform sheet of air flow across the layers of the three-dimensional object to remove heat from the layers of the three-dimensional object, the at least one uniform sheet of air flow being redirected by a curved ducting and at least one protrusion to thicken the width of the uniform sheet of air flow and direct it towards the layers of the three-dimensional object.

11. The method of claim 10 further comprising:

forming the layers of the three-dimensional object by dispensing the build material from a dispensing device; and directing the uniform sheet of air flow away from the dispensing device.

12. The method of claim 11 further comprising:

establishing reciprocal motion in a main scanning direction relatively between the three-dimensional object and the dispensing device; and wherein the substantially uniform sheet of air how is directed substantially parallel to the main scanning direction.

13. The method of claim 11 further comprising:

establishing motion in a secondary scanning direction relatively between the three-dimensional object and the dispensing device; and wherein the substantially uniform sheet of air flow is directed substantially parallel to the secondary scanning direction.

14. The method of claim 11 further comprising:

establishing a substantially undisturbed pocket of air around the dispensing device by directing the air flow away from the dispensing device.

* * * * *